United States Patent
Allen et al.

(10) Patent No.: US 6,887,587 B2
(45) Date of Patent: May 3, 2005

(54) REFLECTIVE COATINGS TO REDUCE RADIATION HEAT TRANSFER

(75) Inventors: William P. Allen, Portland, CT (US); William A. Veronesi, Hartford, CT (US); Robert J. Hall, West Hartford, CT (US); Michael J. Maloney, Marlborough, CT (US); John W. Appleby, Jupiter, FL (US); Douglas C. Hague, Overland Park, KS (US); Abdus Khan, Ennetbaden (CH)

(73) Assignee: United Technologies Corporation, Hartford, CT (US)

( * ) Notice: Subject to any disclaimer, the term of this patent is extended or adjusted under 35 U.S.C. 154(b) by 59 days.

(21) Appl. No.: 10/458,043

(22) Filed: Jun. 10, 2003

(65) Prior Publication Data

US 2004/0258946 A1 Dec. 23, 2004

Related U.S. Application Data

(63) Continuation of application No. 09/900,089, filed on Jul. 6, 2001, now Pat. No. 6,652,987.

(51) Int. Cl.$^7$ ............................ B32B 15/04; F03B 3/12
(52) U.S. Cl. ..................... 428/622; 428/632; 428/633; 428/655; 428/680; 428/469; 428/695; 428/701; 428/702; 428/698; 428/336; 416/241 B; 416/241 R
(58) Field of Search ................................ 428/615, 621, 428/622, 628, 629, 632, 633, 650, 655, 669, 670, 680, 469, 699, 701, 702, 450, 446, 698, 697, 336, 627; 416/241 R, 241 B

(56) References Cited

U.S. PATENT DOCUMENTS

| | | | |
|---|---|---|---|
| 4,904,542 A | | 2/1990 | Mroczkowski |
| RE34,173 E | * | 2/1993 | Kerber |
| 5,209,645 A | | 5/1993 | Chiba et al. |
| 5,350,599 A | * | 9/1994 | Rigney et al. |
| 6,652,987 B2 | * | 11/2003 | Allen et al. ................. 428/622 |

FOREIGN PATENT DOCUMENTS

| | | |
|---|---|---|
| EP | 0714996 | 6/1996 |
| GB | 1419054 | 12/1975 |

OTHER PUBLICATIONS

Electro–Optical Industries, Material Emissivity Properties, 1197 (no month).*

Patent Abstracts of Japan, vol. 1995, No. 02, Mar. 31, 1995 & JP 06 306640 (Mitsubishi Heavy Ind Ltd) Nov. 1, 1994.

* cited by examiner

*Primary Examiner*—Jennifer McNeil
(74) *Attorney, Agent, or Firm*—Bachman & LaPointe, P.C.

(57) ABSTRACT

The present invention relates to a method for forming an article having a protective ceramic coating which reduces radiation heat transport through the ceramic coating. The protective ceramic coating includes one or more embedded reflective metallic layers for reducing the radiation heat transport. The method for forming the protective coating broadly comprises the steps of forming a ceramic coating on a substrate and embedding at least one reflective metallic layer within the ceramic coating.

23 Claims, 2 Drawing Sheets

REFLECTIVE COATINGS TO REDUCE RADIATION HEAT TRANSFER

CROSS REFERENCE TO RELATED APPLICATION(S)

This application is a continuation of U.S. patent application Ser. No. 09/900,089, filed Jul. 6, 2001, now U.S. Pat. No. 6,652,987 entitled "REFLECTIVE COATINGS TO REDUCE RADIATION HEAT TRANSFER", by William P. Allen et al.

BACKGROUND OF THE INVENTION

The present invention relates to an article having a coating for reducing radiation heat transfer, in particular a reflective ceramic coating, and to a method for forming the coated article.

The application of thermal barrier coatings to turbine components is an effective method for increasing the working temperature of the turbine section and for improving overall engine efficiency. Thermal barrier coatings reduce the substrate temperatures of cooled articles, thereby increasing component service life while maintaining a given efficiency. They also maximize the effectiveness and efficiency of compressor exit air used to cool turbine components. Although surface temperatures of a turbine component may be higher than 2000° F., the surface temperature of the overlying ceramic thermal barrier coating will be as much as 300° F. hotter or more.

A typical state-of-the-art zirconium oxide-based thermal barrier coating 10 applied by electron beam physical vapor deposition to a nickel-based alloy substrate 12 is illustrated in FIG. 1. Prior to deposition of the coating, a metallic bond layer 14 is usually applied to the surface of the substrate. With electron beam physical vapor deposition processing, the oxide ceramic of the coating usually acquires a columnar morphology during growth. Yttrium, magnesium, calcium and/or other suitable oxide is typically added to the zirconium oxide to stabilize the tetragonal and/or cubic crystal structure required for coating durability.

The primary benefits of such zirconium oxide-based ceramic thermal barrier coatings are reduced metal temperatures and reduced cooling requirements. These benefits are derived from the inherently low thermal conductivity of the coating material. At higher-temperature, heat transport through a conventional ceramic thermal barrier coating occurs via conduction and radiation. Whereas the conduction of heat through these materials via phonon transport remains quite low over a wide range of temperature, the translucent nature of ceramic materials can allow for significant levels of heat transfer via radiation as the temperature increases. The heat transfer problems associated with thermal radiation are exacerbated in modern aircraft engines because of their high combustor pressures, which maximize the production of efficiently radiating carbon particulates, and their high peak combustion temperatures. Thermal radiation can contribute as much or even more to overall heat transfer than convective processes in these engines, particularly as temperatures increase.

Unlike metallic materials which are opaque, the translucent nature of oxide ceramics allows for direct heat transfer via radiation over certain wavelengths. The amount of heat transferred through the ceramic via radiation during service at high temperature depends upon the predominant wavelengths of the incident radiation, the optical properties, such as emissivity and absorption coefficient, of the coating material, and the coating thickness. The optical transmittance of a thermal barrier coating comprised of yttria-stabilized zirconia is such that 80% of incident radiation in the 1–3 $\mu$m wavelength range is transmitted through a 0.002" coating. Since radiation emitted by the combustion gases, which contain water and carbon dioxide, will be concentrated in this wavelength range for the temperatures typically encountered during service, reducing radiation heat transport through the ceramic coating will enhance the insulating properties of the thermal barrier coating.

SUMMARY OF THE INVENTION

Accordingly, it is an object of the present invention to provide a method for forming a protective coating which reduces radiation heat transport.

It is a further object of the present invention to provide an article having a protective coating for reducing the radiative contribution to the overall heat transfer through a ceramic coating.

The foregoing objects are attained by the method and the article of the present invention.

In accordance with the present invention, a method for forming a protective coating which reduces radiation heat transport broadly comprises the steps of forming a ceramic coating on a substrate and embedding at least one reflective layer within the ceramic coating layer. In a preferred embodiment of the present invention, a plurality of reflective layers formed from a precious metal are embedded within the ceramic coating layer.

In accordance with the present invention, an article having a coating for reducing the radiative contribution to heat transfer through a thermal barrier coating is provided. The article broadly comprises a substrate, a ceramic coating formed on the substrate, and at least one layer of reflective material embedded within the ceramic coating to reduce radiation heat transport.

Other details of the method and the article of the present invention, as well as other objects and advantages attendant thereto, are set forth in the following detailed description and the accompanying drawings, wherein like reference numerals depict like elements.

DETAILED DESCRIPTION OF THE PREFERRED EMBODIMENT(S)

Figure 1:
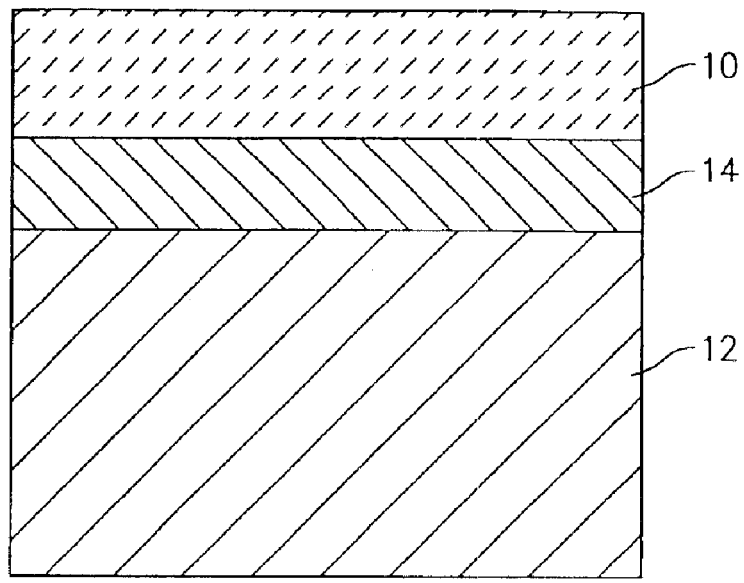
FIG. 1 is a sectional view of a prior art zirconium oxide-based thermal barrier coating applied by electron beam physical vapor deposition.
Figure 2:
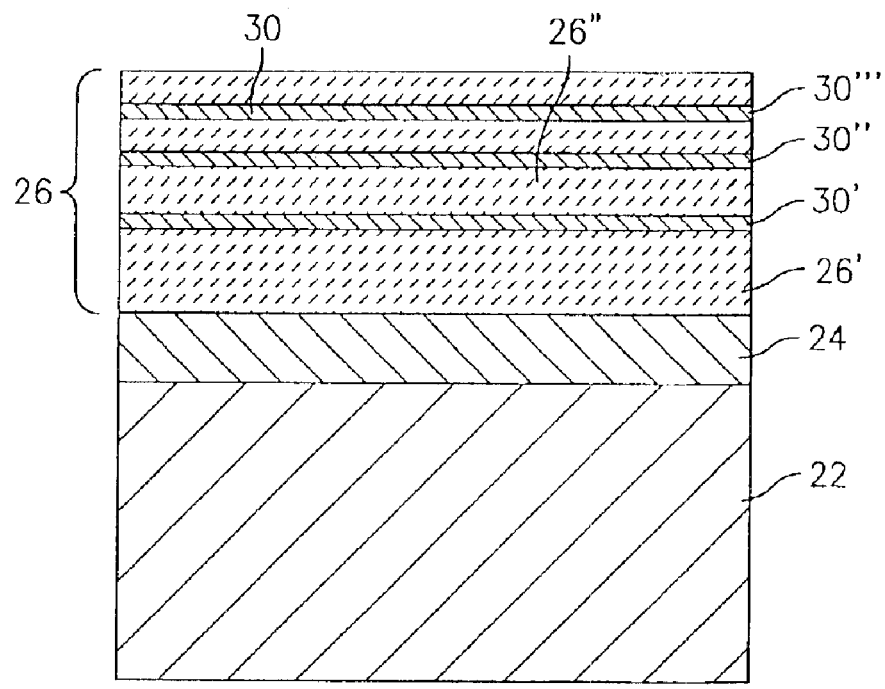
FIG. 2 is a sectional view of a ceramic coating having reflective layers formed in accordance with the present invention.

As previously mentioned, the present invention is directed to forming a protective coating on a substrate which reduces radiation heat transport. Referring now to the drawings, FIG. 2 illustrates a protective coating 26 in accordance with the present invention. As shown therein, the protective coating 26 may be applied to a substrate 22, for example a turbine component such as a turbine blade, a combustor, a nozzle and/or a liner, or an aircraft exhaust duct. The substrate 22 may be formed from any metallic or non-metallic material known in the art. In the context of turbine applications, the substrate 22 may be formed from a nickel-based alloy, an iron-based alloy, or a cobalt-based alloy. The substrate 22 could also be formed from a ceramic material such as a zirconia based ceramic, an alumina based ceramic, a magnesia based ceramic, a ceramic composite or a refractory material.

A metallic bond coat 24 is typically formed on the substrate 22 prior to the application of a protective ceramic coating 26. The bond coat 24 may be any suitable bond coat known in the art, such as a platinum-aluminide or diffusion aluminide coating or a MCrAlY type coating. The bond coat 24 may be applied in any manner known in the art. For example, a platinum-aluminum coating may be formed by electrodepositing a layer of platinum, vapor depositing an aluminum layer over the platinum, and thereafter interdiffusing the two layers. A MCrAlY coating may be applied using low-pressure plasma spray, air plasma spray, high velocity oxygen flame deposition, or electron beam physical vapor deposition.

The protective ceramic coating 26 applied to the substrate 22 may comprise any suitable ceramic coating known in the art. For example, the ceramic coating 26 may be a thermal barrier coating such as a yttria-, magnesium-, gadolinia- or calcium-stabilized zirconia coating. The ceramic coating 26 may be formed in any suitable manner known in the art, such as by electron beam physical vapor deposition, to have any desired depth, such as a depth in the range of from about 0.002 inches to about 0.040 inches.

As previously mentioned, ceramic coatings allow for direct heat transfer via radiation over certain wavelengths. This is due to the translucent nature of the oxide ceramics of the coatings. To reduce such radiation heat transport, one or more layers 30 of a reflective material is embedded within the ceramic coating 26. Each reflective material layer 30 may be continuous or discontinuous and is preferably formed from an oxidation resistant material having a melting point higher than the use temperature of the ceramic coating 26. Each layer 30 preferably has a thickness that is opaque to radiation, i.e. a thickness in the range of from about 0.5 microns to about 25.5 microns, preferably from about 1.0 micron to about 5.0 microns, and most preferably from about 1.0 micron to about 3.0 microns. Each layer 30 is also preferably formed so that it has an emissivity of less than about 0.5, preferably in the range of from about 0.1 to about 0.5.

Each layer 30 may be formed from a noble metal such as osmium, rhenium, or ruthenium. In a preferred embodiment of the present invention, each layer 30 is formed from a precious metal selected from the group consisting of platinum, platinum alloys, palladium, palladium alloys, rhodium, rhodium alloys, iridium, iridium alloys, and mixtures thereof. Precious metals are well suited to this application because they are resistant to oxidation in a turbine environment. As a result, they will therefore retain the desired optical properties during service. Further, they possess a melting point in excess of the ceramic coating use temperature. Still further, given the reflective opaque nature of reflective layers formed from these materials, propagation of phonons through the ceramic coating 26 will be substantially reduced.

To form the ceramic coating 26 with the embedded reflective material layer(s) 30, a base layer 26' of the ceramic coating is first formed by depositing a ceramic material for a time sufficient to obtain a desired depth for the layer 26'. Thereafter, a reflective material layer 30' is formed by depositing a layer of precious metal onto the base layer 26'. Any suitable technique known in the art, such as RF sputtering, ion beam sputtering, plasma spray techniques or (electron beam physical) vapor deposition, may be used to deposit the reflective material layer(s). The depth of the reflective metallic layer 30' may be controlled by controlling the deposition time to obtain a desired layer thickness. After the reflective material layer 30' has been deposited, a cover layer 26" of ceramic coating is formed over the reflective metallic layer 30', thereby embedding the reflective metallic layer 30'. In some instances, only a single reflective material layer 30' is required to achieve the desired effect; however, where multiple layers 30', 30" and 30'" of reflective material are to be embedded in the ceramic coating 26, the protective coating 26 is formed by alternating deposition of a layer of ceramic material with deposition of a reflective metallic layer. If desired, different ones of the layers 30', 30", and 30'" may be formed from different metallic materials.

It is desirable to place the reflective layer(s) 30 as close as possible to the hot side of the coated article, i.e. the exposed surface of the coating, to achieve the maximum benefit in terms of cooling the substrate. The only constraint on the placement of the layer(s) 30 is the local temperature.

While a bond coat 24 is typically used in conjunction with ceramic coatings, the bond coat 24 may be omitted in cases where the ceramic coating does not require a bond coat.

It should further be noted that the ceramic coating layers may also be continuous or discontinuous.

Figure 3:
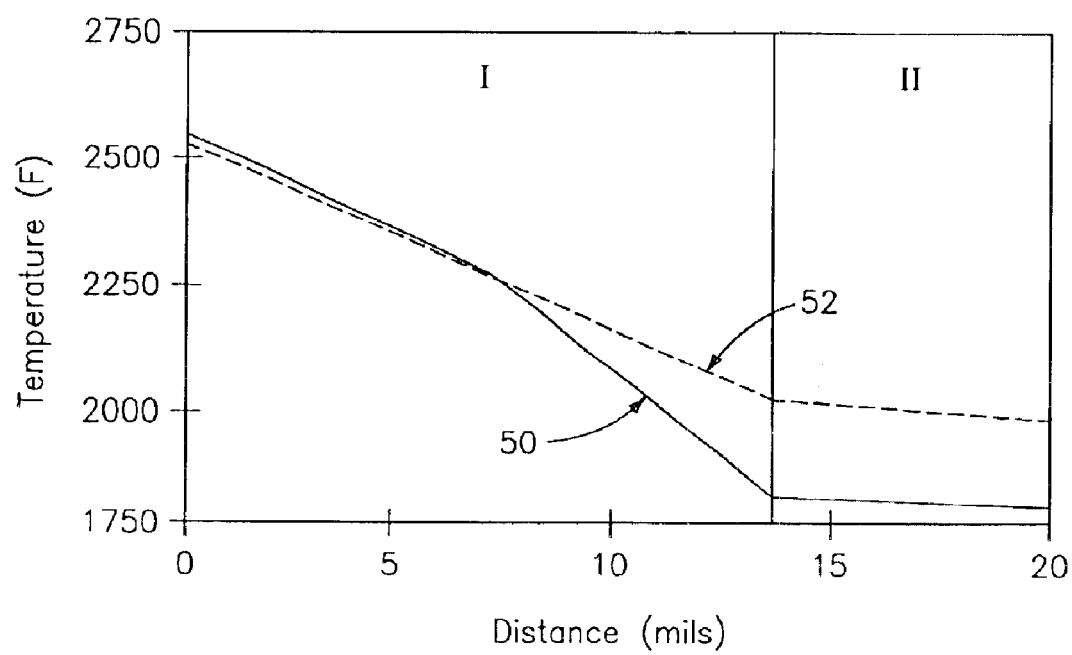
FIG. 3 is a graph showing temperature vs. distance from an exposed surface and illustrating the benefits attained by forming a protective coating in accordance with the present invention.

To demonstrate the improvements afforded by the present invention, a computer model describing one-dimensional heat flow through a coating having at least one reflective metal layer embedded within a ceramic thermal barrier coating was developed. The model was used to simulate the radiative heat transport experienced by combustor liners in a modern, high pressure gas turbine. As shown in FIG. 3, the placement of a single metallic layer under the exposed surface of the ceramic coating (line 50), as compared to a ceramic coating without a reflective layer (line 52), yields a significant reduction in the temperature in the ceramic coating as one moves away from the exposed surface (section I) and in the underlying metallic substrate (section II) for values of reflective layer emissivity within the aforesaid range. The decreased metal temperature in the cases shown results from a 12–24% reduction in the net heat flux as radiative heat transfer is blocked by the reflective layer(s). The model predicts even larger metal temperature reductions when the reflective metal layer(s) are placed closer to the exposed surface. While the coated article and the method for forming same have been described in the context of protecting turbine components, it should be appreciated that the reflective protective coating of the present invention and the method of forming same may be used in other applications to protect components which are exposed to high temperatures, for example, land based turbine components, diesel engine components, carbon based fuel combustion engine components, combustors, and covers for combustors.

It is apparent that there has been provided in accordance with the present invention a reflective coating to reduce radiation heat transfer which fully satisfies the objects, means, and advantages set forth hereinbefore. While the present invention has been described in the context of specific embodiments thereof, other alternatives, modifications, and variations will become apparent to those skilled in the art having read the foregoing description. Therefore, it is intended to embrace those alternatives, modifications, and variations as fall within the broad scope of the appended claims.

What is claimed is:

1. An article which comprises:

a substrate formed from a metallic material selected from the group consisting of nickel-based alloys, iron-based alloys, cobalt-based alloys, and mixtures thereof;

a ceramic coating formed on and contacting a surface of said substrate;

at least one reflective metallic layer embedded within said ceramic coating to reduce radiation heat transport; and said at least one reflective metallic layer having a thickness sufficient to be opaque to radiation.

2. An article according to claim 1, wherein said thickness is in the range of from about 0.5 microns to about 25.5 microns.

3. An article according to claim 1, wherein said thickness is in the range of from about 1.0 micron to about 5.0 microns.

4. An article according to claim 1, wherein said thickness is in the range of from about 1.0 micron to about 3.0 microns.

5. An article according to claim 1, wherein said at least one reflective metallic layer has an emissivity less than 0.5.

6. An article according to claim 1, wherein said at least one reflective metallic layer has an emissivity in the range of from 0.1 to 0.5.

7. An article according to claim 1, wherein said ceramic coating comprises a thermal barrier coating.

8. An article which comprises:

a substrate formed from a metallic material selected from the group consisting of nickel-based alloys, iron-based alloys, cobalt-based alloys, and mixtures thereof;

a ceramic coating formed on said substrate;

at least one reflective metallic layer embedded within said ceramic coating to reduce radiation heat transport;

said at least one reflective metallic layer having a thickness sufficient to be opaque to radiation;

said ceramic coating comprising a thermal barrier coating;

a bond coat intermediate said substrate and said thermal barrier coating; and said thermal barrier coating comprising a yttria-stabilized zirconia coating.

9. An article according to claim 1, further comprising a plurality of said reflective metallic layers embedded within said ceramic coating.

10. An article according to claim 1, wherein said at least one reflective metallic layer is formed from an oxidation resistant material having a melting point higher than a use temperature for said ceramic coating.

11. An article which comprises:

a substrate;

said substrate being selected from the group consisting of nickel-based alloys, iron-based alloys, cobalt-based alloys, and mixtures thereof;

a ceramic coating formed on and in contact with a surface of said substrate;

at least one reflective metallic layer embedded within said ceramic coating to reduce radiation heat transport; and said at least one reflective metallic layer having an emissivity less than 0.5.

12. An article according to claim 11, wherein said emissivity is in the range of 0.1 to 0.5.

13. An article according to claim 11, wherein said at least one reflective metallic layer has a thickness sufficient to be opaque to radiation.

14. An article according to claim 13, wherein said thickness is in the range of from about 0.5 microns to about 25.5 microns.

15. An article according to claim 11, wherein said ceramic coating comprises a thermal barrier coating.

16. An article according to claim 11, further comprising a plurality of said reflective metallic layers embedded within said ceramic coating.

17. An article which comprises:

a substrate;

said substrate being selected from the group consisting of nickel-based alloys, iron-based alloys, cobalt-based alloys, and mixtures thereof;

a ceramic coating formed on said substrate;

at least one reflective metallic layer embedded within said ceramic coating to reduce radiation heat transport;

said at least one reflective metallic layer having an emissivity less than 0.5;

said ceramic coating comprising a thermal barrier coating;

a bond coat intermediate said substrate and said thermal barrier coating; and said thermal barrier coating comprising a yttria-stabilized zirconia coating.

18. A turbine component comprising:

a substrate formed from a metallic material selected from the group consisting of nickel-based alloys, iron-based alloys, cobalt based alloys, and mixtures thereof;

a ceramic coating formed on and in contact with a surface of said substrate;

at least one reflective metallic layer embedded within said ceramic coating to reduce radiation heat transport; and said at least one reflective metallic layer having a thickness sufficient to be opaque to radiation and an emissivity less than 0.5.

19. A turbine component according to claim 18, further comprising a plurality of said reflective metallic layers embedded within said ceramic coating.

20. An article comprising:

a substrate formed from a ceramic material;

a ceramic coating formed on said substrate;

said ceramic coating comprising a thermal barrier coating formed from a yttria-stabilized zirconia coating; and at least one reflective metallic layer embedded within said ceramic coating to reduce radiation heat transport.

21. An article according to claim 20, further comprising a bond coat layer intermediate said substrate and said thermal barrier coating.

22. An article according to claim 20, wherein said at least one reflective metallic layer has a thickness sufficient to be opaque to radiation and an emissivity less than 0.5.

23. An article according to claim 20, wherein said emissivity is in the range of 0.1 to 0.5.

* * * * *